July 7, 1936.  C. H. KINDL  2,046,689
SHOCK ABSORBER
Filed May 18, 1934   4 Sheets-Sheet 1

INVENTOR
CARL H. KINDL
BY
Spencer, Hardman & Fehr
ATTORNEYS

July 7, 1936.   C. H. KINDL   2,046,689
SHOCK ABSORBER
Filed May 18, 1934   4 Sheets-Sheet 2

INVENTOR
CARL H. KINDL
BY
*Spencer, Hardman & Fish*
ATTORNEYS

July 7, 1936.  C. H. KINDL  2,046,689
SHOCK ABSORBER
Filed May 18, 1934  4 Sheets-Sheet 3

INVENTOR
CARL H. KINDL
BY
Spencer, Hardman and Khv
ATTORNEYS

July 7, 1936.                C. H. KINDL                2,046,689
                            SHOCK ABSORBER
                        Filed May 18, 1934            4 Sheets-Sheet 4
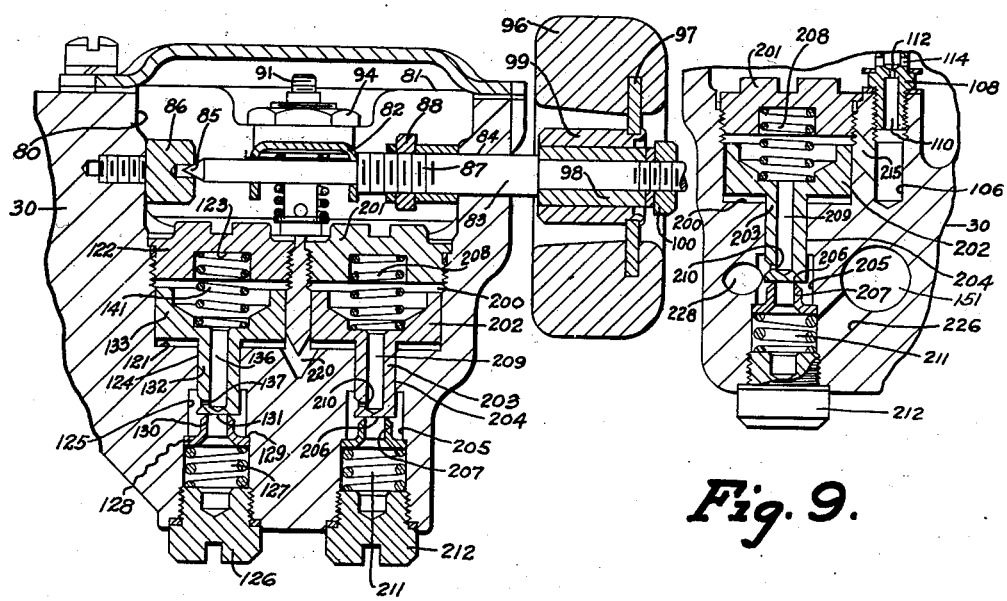
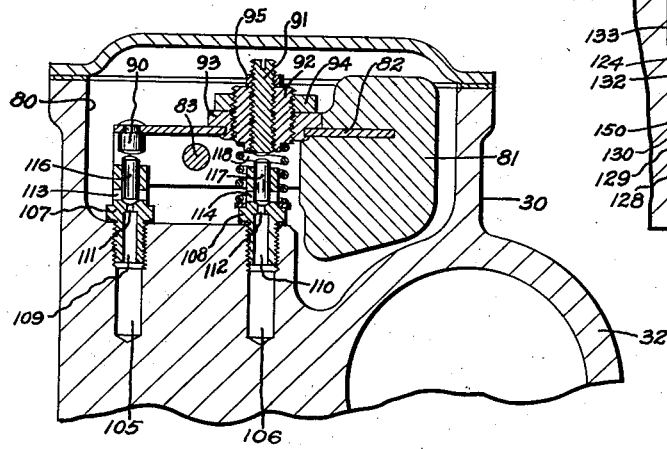
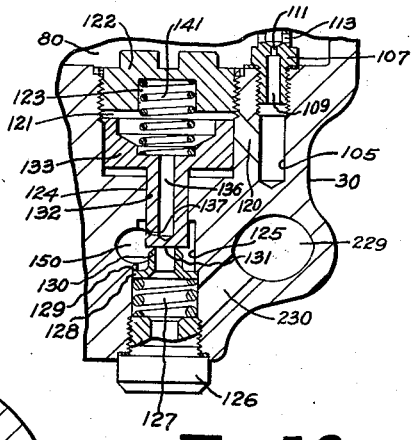
INVENTOR
CARL H. KINDL
BY
*Spencer, Hardman and Jehl*
ATTORNEYS Patented July 7, 1936

2,046,689

UNITED STATES PATENT OFFICE 2,046,689

SHOCK ABSORBER

Carl H. Kindl, Dayton, Ohio, assignor to General Motors Corporation, Detroit, Mich., a corporation of Delaware Application May 18, 1934, Serial No. 726,252

11 Claims. (Cl. 188—88)

This invention relates to improvements in hydraulic shock absorbers and particularly to fluid flow control devices therefor.

It is among the objects of the present invention to provide a hydraulic shock absorber adapted to be adjusted automatically in response and proportionately to accelerations in the movement of the shock absorber.

It is among the further objects of the present invention to provide means adapted to control said automatic adjustments so that they are made gradually and not suddenly thereby eliminating jerky operation of the shock absorber.

Further objects and advantages of the present invention will be apparent from the following description, reference being had to the accompanying drawings wherein a preferred embodiment of one form of the present invention is clearly shown.

In the drawings:

Figure 8 is a detailed sectional view taken substantially along the line 8—8 of Figure 7.

Figure 9 is a fragmentary detailed sectional view taken substantially along the line 9—9 of Figure 3.

Figure 10 is a fragmentary detailed sectional view taken substantially along the line 10—10 of Figure 3.

Figure 11 is a detailed sectional view of a portion of the shock absorber taken substantially along the line 11—11 of Figure 3.

Figure 1:
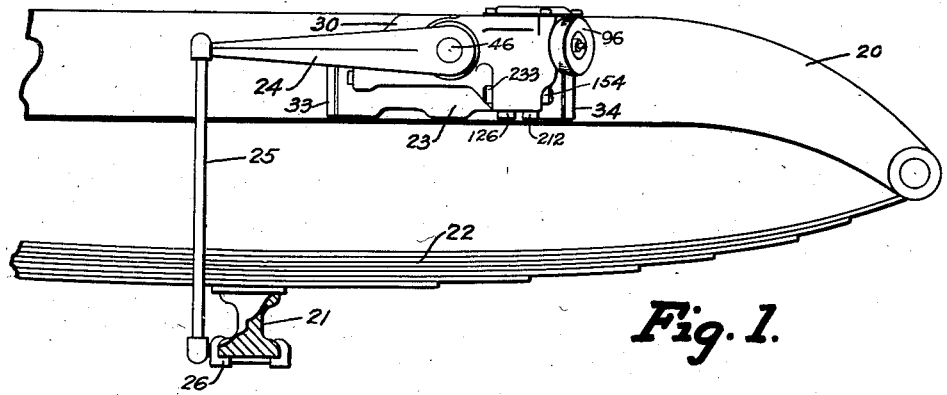
Figure 1 is a fragmentary side view of the vehicle chassis, a shock absorber equipped with the present invention being shown applied thereto. The road wheels of the vehicle have been omitted for the sake of clearness.

Referring to the drawings and particularly to Figure 1, numeral 20 designates a side frame member of the vehicle which is supported upon the vehicle axle 21 by the spring 22. The shock absorber, designated as a whole by the numeral 23, is attached to the frame 20 of the vehicle in any suitable manner. This shock absorber is actuated by an operating arm 24, the free end of which is swivelly attached to one end of a link 25, the other end of which is swivelly secured to the axle 21 by a clamping member 26. It may readily be seen that in response to the movement of the axle and spring 21 and 22 respectively toward and away from the frame 20, the link connected between axle 21 and arm 24 will cause said arm to be rotated clockwise and counterclockwise, resulting in the operation of the reciprocative member of the shock absorber.

Figure 4:
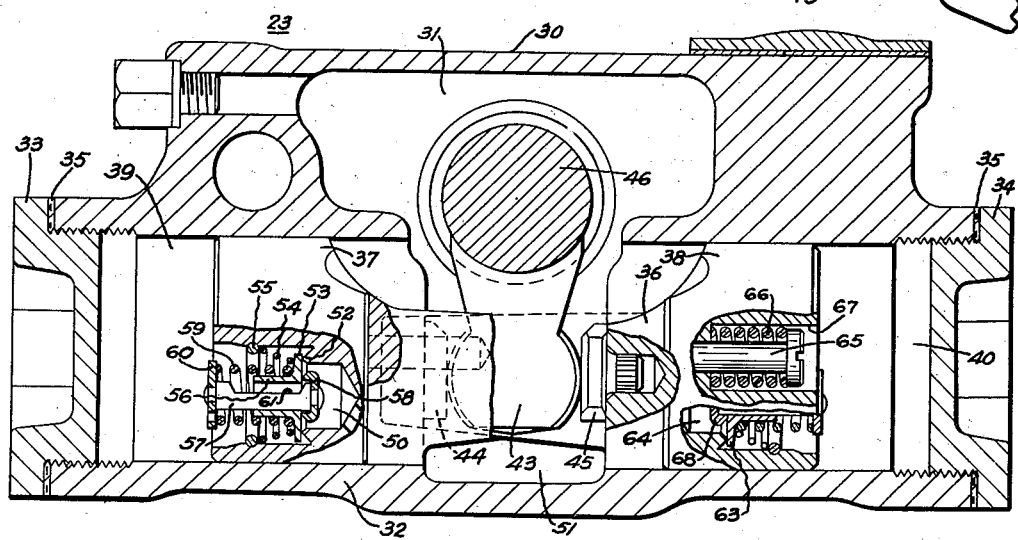
Figure 4 is a longitudinal sectional view taken substantially along the line 4—4 of Figure 3. Certain elements of the shock absorber are shown in elevation in this view for the sake of clearness.
Figure 5:
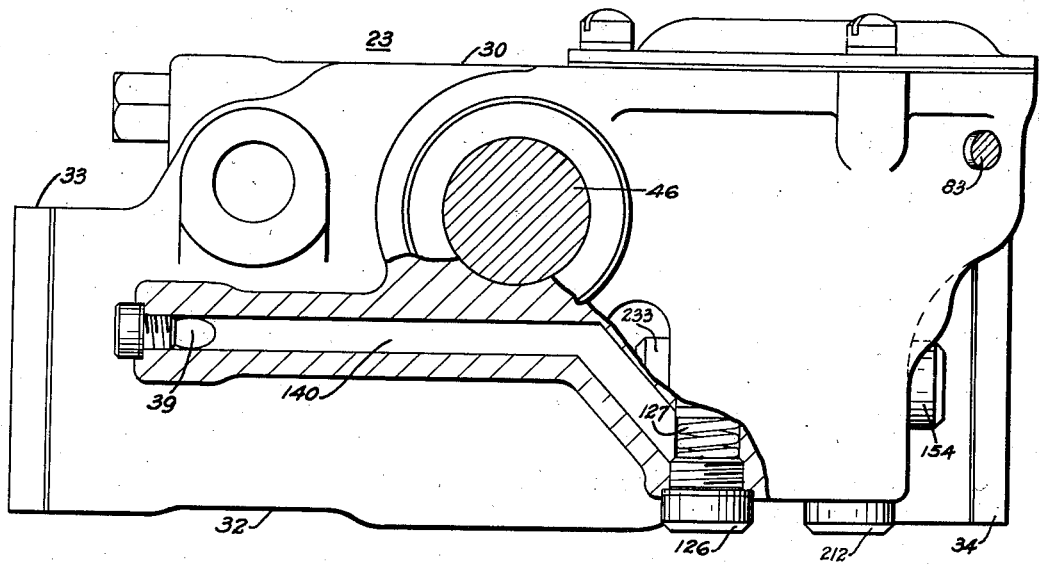
Figure 5 is a front elevation of the shock absorber, a portion thereof being broken away to show one of the fluid flow ducts. In this view the damper weight has been omitted.

Referring particularly to Figure 4, the shock absorber 23 is shown comprising a casing 30 providing a fluid reservoir 31, and a cylinder 32. The respective ends of the cylinder 32 are closed by cylinder heads 33 and 34, threaded in the cylinder ends and provided with gaskets 35 to prevent fluid leaks. Within the cylinder there is provided a piston 36 having two oppositely disposed head portions 37 and 38 which form fluid displacement chambers 39 and 40, respectively, at opposite ends of the cylinder 32. For purposes of description, the displacement chamber 39 is termed "the spring compression control chamber", and the chamber 40 is termed "the spring rebound control chamber". Intermediate the cylinder head portions 37 and 38 there is provided a recess into which the piston-operating cam 43 extends, said cam-engaging wear pieces 44 and 45 carried by the inner walls of the respective head portions 37 and 38. This cam 43 is attached to, or formed integral with, a rocker shaft 46, journaled in the casing 30 transversely thereof. One end of the shaft 46 extends outside of the shock absorber and has the shock absorber operating arm 24 secured thereto.

From the aforegoing description it will be seen that when the arm 24 is rotated clockwise as a result of the movement of the axle 21 and spring 22 toward the frame 20, the shaft 46 and its cam 43 will move the piston 36 toward the left of the end of the shock absorber as regards Figures 1 and 4, and thus the fluid within the spring compression control chamber 39, will have pressure exerted thereupon causing it to be forced from said chamber under pressure. Reversed movement of the axle 21 and the spring 22 will result in a counterclockwise rotation of the shaft 46 and its cam 43 and consequently piston 36 is moved toward the right end of the shock absorber as regards Figures 1 and 4, and consequently fluid within the spring rebound control chamber 40 will be forced under pressure from said chamber.

In the present construction the piston has fluid flow control devices which function under certain conditions. Inasmuch as each piston head portion is equipped with a similar fluid flow control device, only one of them will be described detailedly for the sake of brevity. Referring particularly to the piston head portion 37, as shown in Figure 4, it will be noted that this piston head portion has a through passage 50 adapted to provide for the transfer of fluid between the chamber 39 and the intermediate chamber 51, which is always in communication with the fluid reservoir 31. It will also be noted that within the passage 50 there is provided an annular valve seat 52, in the form of a sharp-edge ridge, adapted to be engaged by the intake valve 53, which is maintained upon said seat 52 by a spring 54, one end of which engages the valve 53, the other a retainer ring 55 seated in an annular groove provided in the surface of the passage 50 within the piston head. This intake valve 53 has a cylindrical body 56 in which the body portion 57 of the pressure release valve 58 is slidably carried. It will be noted that the valve 58 is yieldably maintained in engagement with the end surface of the intake valve 53 by the spring 59 which is interposed between the valve 53 and an abutment disc 60 secured to the outer end of the body portion 57 of the valve 58. The body portion 57 has longitudinal slot 61 provided for the transfer of fluid through the valve 53 when the valve 58 is moved from engagement with said valve 53. However, normally the slot 61 is within the confines of the valve 53 and due to the engagement of valve 58 with valve 53 no fluid will normally flow through said slot 61. In the piston head portion 38 the valve comparable to valve 53 is designated by the numeral 63, while the valve comparable to valve 58 is designated by the numeral 68. The passage through this piston head portion is designated by the numeral 64. A stud 65 extends slidably through an opening in the piston head portion 38 and threadedly engages the piston head portion 37. A spring 66 is positioned beneath the head of the stud 65 and engages the bottom end of a recess 67 in the piston head portion 38. This stud with its spring 66 yieldably maintains the two piston head portions 37 and 38 in proper relative position so that substantially at all times their respective wear pieces 44 and 45 are in engagement with the operating cam 43. Where the piston 36 comprises two separate piston head portions 37 and 38 a stud with its spring 66 is used. However, where the piston 36 is of one piece and has integral heads 37 and 38, the stud 65 with its spring 66 may be eliminated.

When the piston 36 is moved toward the left in response to the approaching movement of the spring 22 toward the frame 20 pressure is exerted upon the fluid within the chamber 39, as has been hereinbefore described, and at the same time fluid will flow through the passage 64 in the piston head portion 38 connecting the intermediate chamber 51 with the chamber 40, moving the entire valve assembly including valves 63 and 68 so that a substantially free flow of fluid is established into the chamber 40. When the piston is moved toward the right, as regards Figure 4, the fluid within the chamber 51 urges the valve 53 from the seat 52 and a substantially free flow of fluid is permitted through the passage 50 into the chamber 39.

In response to a predetermined high fluid pressure in chamber 39, as the piston moves toward the cylinder head 33, valve 58 will be moved from engagement with valve 53 and a restricted flow of fluid from the chamber 39 through passage 50 into the intermediate chamber 51 obtains. Likewise, in response to a predetermined high pressure in chamber 40, valve 68 will be moved from engagement with the valve 63 and a restricted flow of fluid will be permitted from chamber 40 to the intermediate chamber 51.

Figure 2:
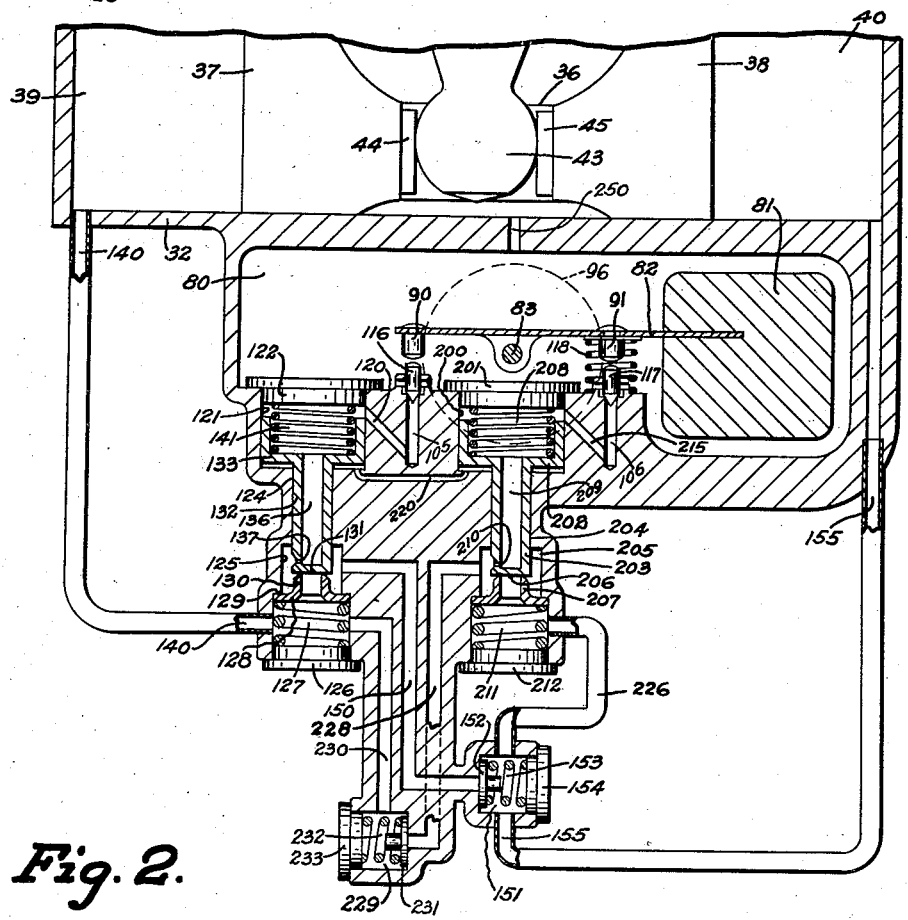
Figure 2 is a diagrammatic view showing the various circuits through which fluid flows during the operation of the shock absorber and the control devices therefor.
Figure 3:
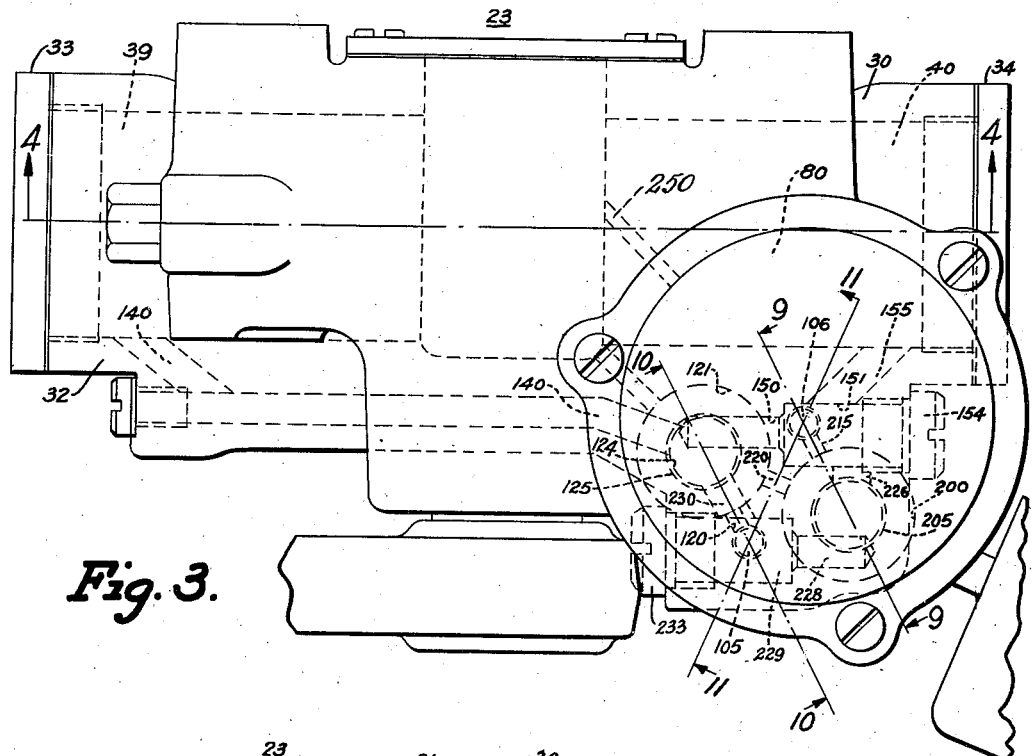
Figure 3 is a plan view of the shock absorber.

As has been mentioned in the objects of the present invention, the shock absorber is provided with means for automatically adjusting it in response and proportionate to accelerations in the movement of the shock absorber. It is desired to provide a shock absorber which will vary its resistance to the movement of the frame 20 and the axle 21 in accordance with accelerations of one of these members, particularly the frame 20. Means are also provided which will prevent these automatic adjustments from being made too suddenly or with too rapid repetitions. In Figure 2 the mechanical elements and fluid circuits of this automatic adjusting mechanism are diagrammatically set forth, while various other figures, such as 6 to 10 inclusive, show the actual construction of the shock absorber by fragmentary sectional views. With reference particularly to Figures 2, 3, 8, 9, and 10, the shock absorber casing 30 is shown having a large recess 80 provided therein forming the chamber in which the inertia weight 81 is pivotally supported. This inertia weight is secured to one end of a pivotally supported lever 82. This lever 82 is secured to a shaft 83 which shaft is journaled at 84 in the casing 30. The one end of said shaft is pointed, as at 85, this pointed end being supported in a recess block 86 carried by the casing 30. Adjacent to bearing 84 of the shaft 83 said shaft is threaded as at 87, for receiving the adjusting nut 88 whereby the shaft 83 may be adjusted longitudinally to obtain a free working engagement between the pointed end 85 of the shaft 83, and its supporting block 86. Lever 82 has two valve-engaging and operating members 90 and 91 carried thereby on opposite sides of its pivotal shaft 83. The member 90 is rigidly secured to the lever 82 while the member 91 is adjustably carried in an intermediate member 92 which in turn is adjustably supported by a nut 93 secured on the lever 82. The member 92 is maintained in adjusted position in the nut 93 by a lock nut 94 and a similar lock nut 95 maintains member 91 in adjusted position in the member 92. From the aforegoing it will be understood that in response to the oscillating movements of the weight and its bracket or lever 82, secured on shaft 83, a see-saw movement of the members 90 and 91 will result, this see-saw movement being used for actuating fluid flow control devices as will be described hereinafter.

Shaft 83 extends to the outside of the casing 30 and has the dampener flywheel 96 coaxially secured thereon in any suitable manner. For purposes of illustration, this flywheel 96 is shown attached to a plate 97 which is anchored to a collar 99. This collar is carried by a sleeve 98, clamped upon the shaft 83 by a lock nut 100. It is essential that the flywheel 96 be coaxially secured to the shaft 83 for as the weight member 81 is moved up and down with its pivotal shaft 83 flywheel 96 is rotated in one direction or the other, this flywheel tending to dampen the see-saw movement of the weight 81 and prevent its sudden or too rapid repeated movements, thus eliminating the sudden or too rapidly repeated adjustments of the fluid flow control devices actuated by the members 90 and 91 on the lever 82 as will be described.

Two holes 105 and 106 are bored into the bottom surface of the chamber or recess 80 in the casing 30, both of which are interiorly threaded to receive valve-retaining standards 107 and 108 respectively. The detailed construction of these standards is clearly shown in Figure 11. Each standard has a longitudinally extending through-passage, the one in the standard 107 being designated by the numeral 109, and the one in the standard 108 being designated by the numeral 110. The through-passage 109 has a reduced throat portion providing an orifice 111 while the through-passage 110 is provided with a similar orifice 112. Above the orifice 111 and communicating with the chamber 80 is a cross-passage 113, a similar cross-passage 114 being provided in the standard 108. Standard 107 slidably carries a valve 116 so that normally and by gravity this valve 116 shuts off communication between the orifice 111 and the cross-passage 113. A similar valve 117 is slidably carried in the standard 108 and by gravity shuts off communication between the orifice 112 and the cross-passage 114. As shown in Figures 2 and 11, the contacting member 90 on lever 82 of the weight 81 is adapted to engage and actuate the valve 116 while the contacting member 91, adjustably carried by the said lever 82 of weight 81, is adapted to actuate valve 117. A spring 118 is interposed between the standard 108 and the member 92 adjustably carried on the lever 82 of the weight 81. This spring 118 yieldably holds lever 82 and its weight 81 in proper suspended position, in which members 90 and 91 are disengaged from their respective valves 116 and 117.

The hole 105 has a duct 120 leading therefrom, providing communication between said hole 105 and another hole or recess 121 in the bottom of the chamber 80. This recess 121 is interiorly threaded to receive the screw plug 122, the inner end of which is provided with a recess 123 coaxial of the plug. This recess 121 has a counterbore 124 which communicates with a larger diameter bore 125 concentric with the counterbore portion 124 and the recess 121. The end of this bore 125, more remote from the recess 121, is interiorly threaded to receive the plug 126 which acts as a closing member for this recess or bore 125 and also as an abutment member for the spring 127 which urges the member 128 into constant contact with a shoulder 129 provided in the recess or bore 125. The member 128 has a tubular portion extending up into the recess 125 presenting sharp-edge annular ridge which forms a seat 130 for the valve 131. This valve is formed by the end surface of a cylindrical extension 132 provided on the piston 133 which is reciprocatively carried in the recess 121. It will be seen that the area of the piston 133 is considerably larger than the area of the portion of valve 131 exposed to the fluid pressure in seat member 130. The cylindrical extension 132 of piston 133 has a longitudinal channel 136 which, at one end, is in communication with the recess 121 above the piston 133, the opposite end of said channel being in communication with the chamber provided in the recess above the valve seat member 128 through a small orifice 137 formed in the side wall of the member 132. From the aforegoing it may be seen that the passage 109 in the standard 107 communicates with the chamber 125 through the following: hole 105, passage 120, the chamber in recess 121 above the piston 133, through piston passage 136 and its orifice 137.

The portion of the recess 125 below the valve seat member 128, or more particularly that portion directly above the plug 126 is in communication with the spring compression control chamber 39 through a duct 140. As shown in Figures 2, 8, and 10 respectively, a spring 141 is interposed between the piston 133 and the screw plug 122, yieldably urging the piston downwardly into the recess 121 so that the end surface of the piston extension portion 132, forming the valve 131, is yieldably maintained in normal engagement with the valve-seat 130.

Another passage 150 leads from the recess portion 125 adjacent the valve 131, and opens into the valve chamber 151. Communication between the passage or duct 150 and the valve chamber 151 is normally closed by a valve 152 which is yieldably urged into this communication shut-off position by spring 153 interposed between the valve and a screw plug 154 threadedly received in the outer end of the valve chamber 151. The valve chamber 151 is in communication with the spring rebound control chamber 40 through the passage 155.

Another group of fluid circuits similar to that just described and which provides for the transfer of fluid from chamber 40 to chamber 39, and from chamber 40 to a chamber comparable to a chamber 121, will now be described. A recess or bored-out portion 200 is provided in the bottom of the chamber 80 which recess 200 is similar to the recess 121 above described. The interiorly threaded portion of this recess 200 receives a screw plug 201. In this recess 200 a piston 202 is slidably supported, said piston having a tubular extension 203, slidably carried in the counterbore 204 of the recess 200 and extending into the larger diameter counterbore portion 205. Like the extension 132 of the piston 133, extension 203 of the piston 202 has its one end closed, the end wall forming the valve 206 which is yieldably maintained in engagement with the tubular valve-seat member 207 by a spring 208 interposed between the piston 202 and the screw plug member 201. The extension 203 of piston 202 has an interior passage 209 which communicates with the space in recess 205 above the valve-seat member 207 through a small orifice 210 comparable to the orifice 137 of the piston extension 132. The valve-seat member 207 is maintained in its normal position by a spring 211 interposed between said valve-seat member and a screw plug 212 threadedly received in the interiorly threaded end of the recess or bored-out portion 205.

The portion of the recess 200 above the piston and between the piston and screw plug 201 is in communication with the hole 106 through a duct 215. Thus the chamber above the piston 202 is in communication with the valve 117 and the standard 108 through duct 215, hole 106 and the passage 110 in said standard.

In order to eliminate a hydraulic stop beneath the pistons 133 and 202, the spaces beneath said pistons, in the recesses 121 and 200, are in communication with each other through a cross-passage 220.

The space between the valve-seat member 207 and the screw plug 212, which space is occupied by the spring 211, is in communication with the valve chamber 151 through a duct or passage 226.

The space in the bored-out portion 205 occupied by the valve 206 and above the valve-seat 207 has a duct 228 leading therefrom and communicating with a valve chamber 229. Chamber 229 in turn has a passage 230 leading therefrom and opening into the recess portion 125 between the screw plug 126 and the valve member 123 engaged by valve 131. Communication between the duct 228 and duct 230, via the valve chamber 229 is normally shut off by valve 231 which is yieldably urged into its closed or shut-off position by a spring 232 interposed between the valve 231 and a screw plug 233 threadedly received by the outer end of the valve chamber 229.

The device in the present invention is automatically adjustable in response and proportionately to the accelerations of the vertical movements of the vehicle member to which the shock absorber is attached, in this instance to the frame 20. This automatic control is obtained by use of an inertia weight 81 acting to control a certain fluid flow control device in response to accelerations in the upward movement of the shock absorber and another fluid flow control device in response to accelerations in the downward movement of the shock absorber. If the roadbed over which the vehicle is being operated is of the washboard type, that is, if the rises and falls in the surface of the roadbed are comparatively close and numerous then the inertia weight 81 operates with a chattering effect tending to render the control of the shock absorber jerky, resulting in an uncomfortable ride. In the present invention a damper flywheel is associated with the inertia weight which tends to retard the operation of the inertia weight especially when it is acting in response to the vehicle being operated over such a washboard type road. With the flywheel attached the inertia weight will operate more slowly and the chattering effect thereof is substantially eliminated.

The afore-described shock absorber acts in the following manner: supposing that the road wheel of the vehicle strikes an obstruction in the roadway and as a result the axle 21 is suddenly thrust upwardly compressing the spring 22, this sudden thrust of the axle upwardly as well as the sudden compression of the spring 22 will tend to thrust the body-carrying frame 20 of the vehicle upwardly. Connection between the axle 21 and the piston 36 as afore-described will, as a result of this upward movement of the axle 21, move said piston 36 toward the left as regards Figures 1, 2, 3, 4, and 5, thus exerting a pressure upon the fluid within the spring compression control chamber 39. Now the fluid will be forced from the chamber 39 through the tube or passage 140 into the chamber beneath the valve-seat 130. In response to this fluid pressure, valve 131, formed on the extension 132 of the piston 133, will be moved upwardly out of engagement with its valve-seat 130 and against the effect of spring 141, thus permitting fluid to flow from the chamber beneath the valve-seat, through said valve-seat member into the chamber of the recess 125 immediately adjacent the valve 131. From here fluid will flow through the passage 150, engage and move valve 152 from its seat against the effect of the spring 153 to establish fluid flow into the valve chamber 151. From here the fluid flows through duct or passage 155 into the spring rebound control chamber 40. The valve 131 restricts the high pressure fluid flow as it passes through the valve-seat member 130. At the same time valve 152 offers a certain restriction to the fluid flow as it continues from the chamber adjacent valve 131 through ducts 150 and 155 to the chamber 40. This restriction of the fluid flow by valve 152 creates a predetermined back pressure within the chamber about the valve 131, thereby causing the fluid to flow from said chamber through the orifice 137 into and through the passage 136 in the extension 132, of piston 133 to the chamber above the piston 133. From here said fluid flows through duct 129 into the hole 105, thence through the passage and the orifice in the stand 107 past the valve 116 through the transverse passages 113 into the chamber 80 which, as is clearly shown in Figure 2, is in communication with the intermediate chamber 51 connected with the reservoir 31 by passage 250.

As soon as the spring 22 has reached the limit of its compression as a result of the obstruction being met in the roadway and as soon as the vehicle has past over the obstruction, the spring will tend to move through its rebound stroke into its normal load position. At the same time the upward thrust on frame 20 will cause the frame 20 to move upwardly in the direction opposite the expanding spring 22. These will result in the movement of the piston 36 toward the right as regards Figures 1 and 2 thereby exerting pressure upon the fluid within the rebound control chamber 40, forcing said fluid from said chamber through the passage 155 into the valve chamber 151. From this valve chamber the fluid flows through duct 226 into the recess 205 below the valve-seat member 207. The fluid pressure having reached a predetermined degree will move valve 206 on piston 202 from this valve-seat member 207 to establish a flow through said valve-seat member into the recess portion 205 above the valve-seat 207 from where the fluid will flow through the passage 228 to engage the valve 231. This valve 231 will be forced from its seat against the effect of spring 232 and then fluid will flow into the chamber 229 and from this chamber through passage 230 into the chamber beneath the valve-seat member 130 from where the fluid will flow through passage 140 into the spring compression control chamber 39. The valve 231 impedes the fluid flow sufficiently to build up a fluid pressure within the recess 205 above the valve-seat member 207 so that a flow is directed through orifice 210 and passage 209 into the chamber above the piston 202 from whence said fluid flow may continue through the passage 215, hole 106 then through the passage 110 and orifice 112 in the standard 108 past valve 117 through the side opening 114 into the chamber 80.

The two flows just described, that is, the flows controlled by the valves 131 and 206 respectively, provide the initial control of the shock absorber.

The striking of an obstruction in the roadway while causing the vehicle springs to be compressed, will, at the same time, thrust the body-carrying frame 20 upwardly. This upward movement of said frame will be accelerated by the spring 22 exerting lifting forces during its expanding movement or while it is returning to its normal load position. If uncontrolled the accelerations in the movements of the body-carrying frame 20 will cause the occupants of the vehicle an uncomfortable and disagreeable ride especially when said accelerations are particularly pronounced. While the body-carrying frame 20 moves upwardly and the spring is being expanded, the connections between the shock absorber arm 24 and the axle 21 will cause the shock absorber piston 36 to move toward the right as regards Figures 1 to 4 inclusive; thus, fluid will be forced from chamber 40. As a result of the acceleration in this upward movement of the frame 20 and consequently the shock absorber attached thereto, the weight 81 will be moved relatively to the casing 30 of the shock absorber and consequently lever 82 and its pivot pin 83 will be rotated clockwise causing the member 91 on said lever to engage valve 117 and urge it toward the orifice 112 in the standard 108 thereby increasing the restriction to the fluid flowing through said standard. This restriction to the fluid flow through standard 108 will naturally result in a pressure build-up within the chamber above the piston 202. The comparative sizes of the piston 202 and valve 206 are such that a comparatively lower fluid pressure upon the piston may easily overcome the effect of a much higher fluid pressure upon the valve 206. Thus, the pressure built up in the space above piston 202 urges said piston and its valve 206 toward the seat 207 and consequently the restriction to the flow through and past said seat will be increased, this increase in restriction being in accordance with the restriction to the flow of fluid from standard 108 caused by the action of the inertia weight 81. This increased restriction to the fluid flow from chamber 40 naturally results in an increased resistance offered by the shock absorber and thus the objectionable accelerated thrust is controlled.

On the other hand, supposing that the body-carrying frame of the vehicle is moved downwardly at an accelerated rate, resulting in a movement of the piston 36 toward the left. Weight 81 is now moved upwardly so that its lever 82 and shaft 83 will be rotated counter-clockwise. Now the member 90 on the lever 82 engages valve 116, pushing it down in its standard 107 to restrict the fluid flow therethrough and consequently building up the back pressure within chamber 121 above the piston 133. This results in the valve 131 being moved into closer proximity with its valve-seat member 130 and consequently restricting flow through the valve-seat. This restriction, of course, results in an increased resistance offered by the shock absorber to this accelerated downward movement of the body-carrying frame 20 of the vehicle.

It will, of course, be understood that in response to the operation of the vehicle over a washboard type road the body-carrying frame 20 will tend to move with short, oft-repeated jerky motions, causing the weight 81 to move upwardly and downwardly at a rapid rate thereby changing the restriction to the fluid flow too suddenly and consequently causing the shock absorber to operate with a jerky effect. To overcome this a flywheel 96 is coaxially secured to the pivotal shaft 83 of the weight 81 so that each time the weight is set into motion it must overcome the inertia of the flywheel, or as the direction of the movement of the weight 81 is reversed it must retard the movement of the flywheel and also reverse its movement. The effect of the flywheel upon the weight will naturally cause said weight to move more slowly and regulary, thus eliminating its tendency to chatter.

Figure 12:
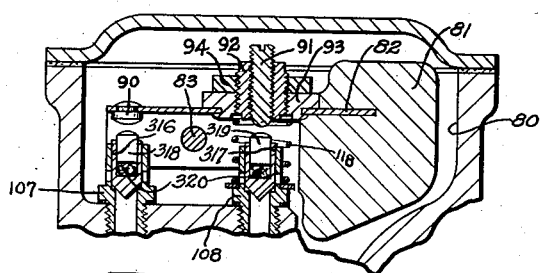
Figure 12 is a detailed sectional view similar to Figure 11, this view, however, showing a modification in the construction of certain of the fluid flow control devices.
Figure 6:
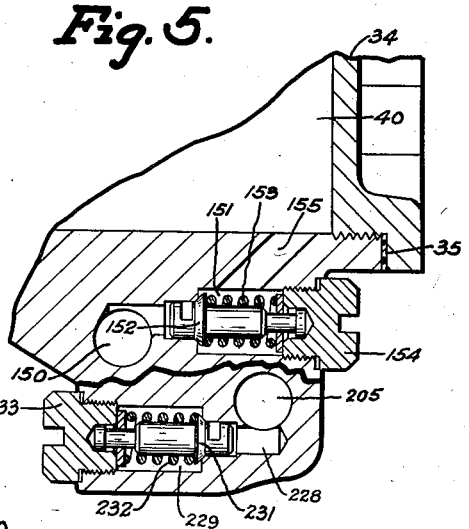
Figure 6 is a fragmentary sectional view of the shock absorber showing the construction and arrangement of two of the fluid flow control devices.
Figure 7:
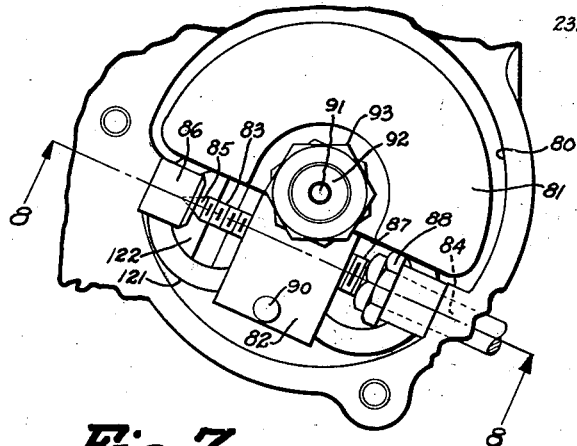
Figure 7 is a fragmentary plan view of the control chamber of the shock absorber with the cover removed. The damper weight was omitted in this view.

In Figure 12 a modified construction of certain of the fluid flow control devices is shown. Here a valve 316 is shown as a substitute for valve 116 and another, 317, for the valve 117. These valves 316 and 317 are recessed to receive plungers 318 and 319 respectively, which plungers rest upon cushioning elements 320 in each valve. These cushioning elements are made of any suitable fibrous material such as felt, or the like. These cushioning elements take up the shock of contact between the valves 316 and 317 and their respective contacting members 90 and 91 on the lever 82.

From the aforegoing it may be seen that applicant has provided a hydraulic shock absorber adapted to be adjusted automatically in accordance with and in proportion to the accelerations in the movements of the shock absorber. He has provided means for controlling the automatic adjusting mechanism so that it will not operate in a jerky manner in response to certain movements of the vehicle frame, but the movement of said automatic adjusting mechanism will be gradual yet effective to control the resistance offered by the shock absorber to body and axle movements.

While the form of embodiment of the present invention as herein disclosed constitutes a preferred form, it is to be understood that other forms might be adopted, all coming within the scope of the claims which follow.

What is claimed is as follows:

1. In a hydraulic shock absorber, the combination with means for circulating fluid from one end of the shock absorber to the other; of means for regulating said fluid circulation; inertia weight controlled means for adjusting said regulating means in proportion to the acceleration in the vertical movements of the shock absorber; and a second inertia weight actuated by the inertia weight controlled means and retarding the movements of the inertia weight controlled means.

2. In a hydraulic shock absorber, the combination with means for circulating a fluid from one end of the shock absorber to the other; of means for controlling said fluid circulation; a spring suspended, inertia weight actuated member for adjusting said controlling means to vary the control over the fluid flow in response and proportionately to accelerations in the vertical movements of the shock absorber; and a flywheel connected with the said member for retarding its movements.

3. In a hydraulic shock absorber, the combination with means for circulating a fluid; of means for controlling said fluid circulation; a pivoted lever having a weight attached to its one end, said lever being adapted to adjust certain of said controlling means in response and proportionate to accelerations in the movements of the shock absorber vertically; and a weight attached to said lever coaxially of its pivotal point.

4. In a hydraulic shock absorber, the combination with means for circulating a fluid therein; of a set of valves adapted to control the fluid circulation in each direction respectively; an inertia weight attached to a pivoted lever which is adapted to adjust one set of valves in response and proportionately to accelerations in the upward movement of the shock absorber and to adjust the other set of valves in response and proportionately to accelerations in the downward movement of the shock absorber; a spring engaging said lever and yieldably holding it in a normal suspended position; and an inertia weight element attached to said lever coaxial with the pivoted point of said lever.

5. In a hydraulic shock absorber, the combination with means for circulating a fluid back and forth therein; two sets of fluid flow control devices, each adapted to regulate the flow of fluid in one direction; a shaft oscillatably carried by the shock absorber; a lever secured to said shaft and having means adapted to engage a member of each set of fluid flow control devices to adjust same; a weight carried at one end of the lever for actuating it in response and proportionately to accelerations in the upward and downward movement of the shock absorber; a spring yieldably supporting the weight; and an inertia weight coaxially secured to the shaft.

6. In a hydraulic shock absorber, the combination with means for circulating fluid from one end of the shock absorber to the other; of means adapted to be actuated by fluid pressure and by an inertia weight controlled member for regulating said fluid circulation; and an inertia member connected with the inertia weight controlled member for dampening its movements.

7. A hydraulic shock absorber having a casing providing two fluid chambers; means for circulating fluid between said chambers, means adapted to be actuated by fluid pressure to permit said fluid circulation; inertia means adapted to be actuated in response and in accordance with the movement of the shock absorber for varying the effect of said pressure controlled means; and a weight member adapted to be set into motion by the inertia means for dampening the movements of said inertia means.

8. A hydraulic shock absorber having a casing providing two fluid chambers; means for circulating fluid between said chambers, means adapted to be actuated by fluid pressure to permit said fluid circulation; inertia means adapted to be actuated in response to and in accordance with accelerations in the movements of the shock absorber for varying the effect of said pressure controlled means; and a weight member secured to the said inertia means and movable only in a rotary manner for dampening the movement of said inertia means.

9. A hydraulic shock absorber having a casing providing two fluid displacement chambers; means adapted to urge the fluid from said chambers under pressure; ducts connecting said chambers; fluid pressure actuated means for each chamber adapted to permit fluid to flow from its respective chambers to the other chamber; and an inertia weight member hingedly supported by the shock absorber and adapted to adjust said fluid flow controlling means to vary the flow of fluid between the chambers in either direction in response to and accordance with the accelerations in the movements of the shock absorber upwardly or downwardly; and a flywheel secured to the weight coaxially of its pivotal point for damping the movements of said inertia weight member.

10. In a hydraulic shock absorber, the combination with fluid circulating means; valves for controlling said fluid circulation; a weighted member having a pin pivotally supporting the weighted member in the shock absorber, said weighted member being adapted to adjust said valves to vary their control of the fluid circulation proportionately with accelerations in the movements of the shock absorber; and a flywheel carried by said pivot pin.

11. In a hydraulic shock absorber, the combination with fluid circulating means; a valve for controlling said fluid circulation; inertia weight actuated means for adjusting said valve to vary its control of the fluid circulation in response to and proportionately with accelerations in the movements of the shock absorber; and a damper weight supported in the shock absorber and adapted to be directly actuated only by the inertia weight and not by any movement of the shock absorber for controlling the movement of said inertia weight.

CARL H. KINDL.